United States Patent
Ramani et al.

(10) Patent No.: US 11,481,602 B2
(45) Date of Patent: Oct. 25, 2022

(54) SYSTEM AND METHOD FOR HIERARCHICAL CATEGORY CLASSIFICATION OF PRODUCTS

(71) Applicant: Tata Consultancy Services Limited, Mumbai (IN)

(72) Inventors: Ganesh Prasath Ramani, Chennai (IN); Aashish Chandra, Gurgaon (IN); Guruswaminathan Adimurthy, Gurgaon (IN); Jayanth Shenai, Naperville, IL (US); Tharun Job, Westchase, FL (US); Saravanan Gujula Mohan, Hoffman Estates, IL (US)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 340 days.

(21) Appl. No.: 16/889,931

(22) Filed: Jun. 2, 2020

(65) Prior Publication Data
US 2021/0216847 A1 Jul. 15, 2021

(30) Foreign Application Priority Data
Jan. 10, 2020 (IN) .............................. 202021001266

(51) Int. Cl.
*G06N 3/04* (2006.01)
*G06F 40/30* (2020.01)
(Continued)

(52) U.S. Cl.
CPC ............... *G06N 3/04* (2013.01); *G06F 40/30* (2020.01); *G06N 3/08* (2013.01); *G06N 5/00* (2013.01); *G06Q 10/087* (2013.01)

(58) Field of Classification Search
CPC . G06N 3/04; G06N 3/08; G06F 40/30; G06Q 10/08
See application file for complete search history.

(56) References Cited

U.S. PATENT DOCUMENTS

| | | | |
|---|---|---|---|
| 11,367,116 B1 * | 6/2022 | Verma | G06N 20/00 |
| 2011/0047159 A1 * | 2/2011 | Baid | G06F 16/355 |
| | | | 707/738 |

FOREIGN PATENT DOCUMENTS

| | | | |
|---|---|---|---|
| KR | 20120067062 A | * | 12/2010 |
| WO | WO-2017/165774 | | 9/2017 |

OTHER PUBLICATIONS

Cevahir, A. et al. "Large-scale Multi-class and Hierarchical Product Categorization for an E-commerce Giant," *Proceedings of COLING 2016, the 26th International Conference on Computational Linguistics: Technical Papers*, Osaka, Japan, Dec. 11-17, 2016; pp. 525-535.

(Continued)

*Primary Examiner* — Shreyans A Patel
(74) *Attorney, Agent, or Firm* — Finnegan, Henderson, Farabow, Garrett & Dunner LLP

(57) ABSTRACT

This disclosure relates generally to system and method for hierarchical category classification of products. Generally in supervised hierarchical classification, the hierarchy structure is predefined. However, majority of the current machine learning methods either expect the model to learn the hierarchy from the data or requires separate models trained at each level taking the prediction of previous level as an additional input, thereby increasing latency in achieving training accuracy and/or requiring an explicit maintenance module to orchestrate inference and retrain multiple models (corresponding to the number of levels in the hierarchy). The disclosed method and system allows the predefined knowledge about hierarchy drive the learning process of a single model, which predicts all levels of the hierarchy. The disclosed multi-layer network model arrives at a consensus based on prediction at each level, thereby increasing the accuracy of prediction and reducing the training time.

13 Claims, 4 Drawing Sheets

(51) Int. Cl.
    *G06Q 10/08*     (2012.01)
    *G06N 3/08*     (2006.01)
    *G06N 5/00*     (2006.01)

(56) References Cited

OTHER PUBLICATIONS

Vandic, D. et al. (2018). "A Framework for Product Description Classification in E-Commerce," *Journal of Web Engineering*, vol. 17, No. 1 pp. 1-27.

Ristoski, P. et al. (2017). "A Machine Learning Approach for Product Matching and Categorization," retrieved from http://www.semantic-web-journal-net/system/files/swi1664.pdf. (20 pages.).

* cited by examiner

SYSTEM AND METHOD FOR HIERARCHICAL CATEGORY CLASSIFICATION OF PRODUCTS

PRIORITY CLAIM

This U.S. patent application claims priority under 35 U.S.C. § 119 to: India Application No. 202021001266, filed on Jan. 10, 2020. The entire contents of the aforementioned application are incorporated herein by reference.

TECHNICAL FIELD

The disclosure herein generally relates to product category classification and, more particularly, to method and system for hierarchical product category classification using a multi-layered network model.

BACKGROUND

In most of the supervised hierarchical classification problems, the hierarchy structure is predefined. These classification problems can be solved using machine learning methods. However, majority of the current machine learning methods either expect the model to learn the hierarchy from the data or requires separate models trained at each level taking the prediction of previous level as an additional input. While the former method takes longer time to train for accuracy, later one requires an explicit maintenance module to orchestrate inference and retrain N models (usually N=number of levels).

SUMMARY

Embodiments of the present disclosure present technological improvements as solutions to one or more of the above-mentioned technical problems recognized by the inventors in conventional systems. For example, in one embodiment, a processor-implemented method for product category classification by a multi-layered network model is provided. The method includes defining a domain embedding associated with a plurality of products using a word embedding layer of the multi-layer network via one or more hardware processors. The domain embedding includes a hierarchy defined based on a plurality of product descriptions associated with the plurality of products. Further, the method includes expressing, by a rule-embedding layer of the multi-layer network, the hierarchy in a bitmap structure as a set of functions associated with a plurality of levels of the hierarchy, the bitmap structure of the hierarchy comprising bitmap values for each element of the plurality of levels of the hierarchy. In an embodiment, expressing the hierarchy in the bitmap structure includes defining a parent function fora parent level of the hierarchy by assigning a unique multi-bit value to each element belonging to the parent level, and defining a child function for subsequent child levels of the parent level based on the parent function of a root level of the hierarchy. Furthermore, the method includes predicting, for the product category classification a child level of the hierarchy from amongst the plurality of levels based on a dot product of a bitmap value of the parent level and a filter of the child level.

In another aspect, a system for product category classification by a multi-layered network model is provided. The system includes one or more memories; and one or more hardware processors, the one or more memories coupled to the one or more hardware processors, wherein the one or more hardware processors are configured to execute programmed instructions stored in the one or more memories, to define a domain embedding associated with a plurality of products using a word embedding layer of the multi-layer network, the domain embedding comprising a hierarchy defined based on a plurality of product descriptions associated with the plurality of products. The one or more hardware processors are further configured by the instructions to express, by a rule-embedding layer of the multi-layer network, the hierarchy in a bitmap structure as a set of functions associated with a plurality of levels of the hierarchy, the bitmap structure of the hierarchy comprising bitmap values for each element of the plurality of levels of the hierarchy. In an embodiment, the one or more hardware processors are configured by the instructions to express the hierarchy in the bitmap structure by defining a parent function for a parent level of the hierarchy by assigning a unique multi-bit value to each element belonging to the parent level, and defining a child function for subsequent child levels of the parent level based on the parent function of the root level of the hierarchy. The one or more hardware processors are further configured by the instructions to predict, for the product category classification, a child level of the hierarchy from amongst the plurality of levels based on a dot product of a bitmap value of the parent level and a filter of the child level.

In yet another aspect, a non-transitory computer readable medium for method for product category classification by a multi-layered network model is provided. The method includes defining a domain embedding associated with a plurality of products using a word embedding layer of the multi-layer network via one or more hardware processors. The domain embedding includes a hierarchy defined based on a plurality of product descriptions associated with the plurality of products. Further, the method includes expressing, by a rule-embedding layer of the multi-layer network, the hierarchy in a bitmap structure as a set of functions associated with a plurality of levels of the hierarchy, the bitmap structure of the hierarchy comprising bitmap values for each element of the plurality of levels of the hierarchy. In an embodiment, expressing the hierarchy in the bitmap structure includes defining a parent function fora parent level of the hierarchy by assigning a unique multi-bit value to each element belonging to the parent level, and defining a child function for subsequent child levels of the parent level based on the parent function of a root level of the hierarchy. Furthermore, the method includes predicting, for the product category classification a child level of the hierarchy from amongst the plurality of levels based on a dot product of a bitmap value of the parent level and a filter of the child level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
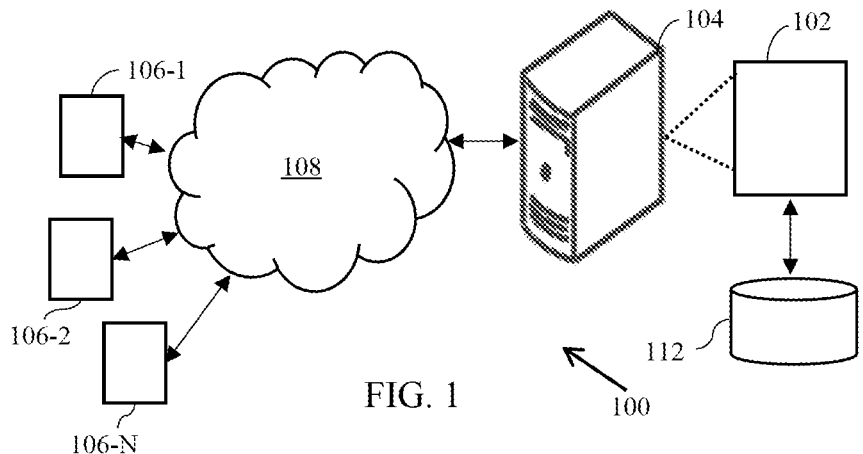
FIG. 1 illustrates an example network implementation 100 of a system 102 for hierarchical product classification in accordance with an example embodiment.

Hierarchical classification techniques for product classification are widely useful in retail, fashion, healthcare, automotive and various other industries. Herein, 'product classification' refers to the task of assigning a product to an existing or new category, given a product description. Further, 'hierarchical classification' refers to a classification that takes a hierarchical structure of the taxonomy into account. For instance, a hierarchical classification related to pet care can be Pet care>Pet food>Dog food>Dry food>Pedigree Dry Dog food>Chicken and Rice>Weight. There can be multiple such hierarchies possible for various products. Each industry follows a unique domain specific hierarchy definition. In certain industries, every manufacturer and retailer might define the products in their own hierarchy, leading to a much diverse and complex learning process for the machine learning models.

Typically, hierarchical models are hard to train especially when the hierarchy is larger. Current methods for training hierarchical models include training different models for each level of hierarchy. As the levels in the hierarchy gets deeper, the accuracy of the models gets affected due to low sample space. Additionally, the number of models to maintain may easily reach thousands in number, thereby making the process of training even more cumbersome and computationally intensive.

Apart from the complexity of training the models, another major drawback of conventional methods for training hierarchical models is that the models do not consider an existing predefined deterministic rule set defining the hierarchy. Technically, the model is expected to learn said rule from the data, which might either take longer training cycles or have lower accuracy. This may further lead to inaccuracies, which are obvious and usually solved as post prediction rule engines. The model through retraining then learns these corrections; however such retraining comes with a cost of retraining thousands of models at each level.

Various embodiments disclosed herein overcome the above limitations and many other challenges of conventional models by providing method and system for hierarchical classification of products. For example, in an embodiment, the disclosed method enables embedding the existing hierarchical rule into the learning process by means of a networked model framework, thereby speeding up the learning process without sacrificing the accuracy. The process of introducing an external stimulus to the learning process facilitates the learning process rather than acting as a fully deterministic model. To achieve this, the layers of the networked model framework still learn the hierarchy while getting the guidance from the external source. This allows the model to understand the item description quicker and better, enabling it to classify more accurately. In addition, the disclosed method uses a single model that is configured to predict a plurality of levels of the hierarchy, thereby eliminating the need for level wise retraining cycles.

Herein, it will be understood that the disclosed method is applicable to any text/Image based hierarchical classification where there exists a predefined hierarchy. For instance, in certain application areas such as e-Commerce product placements, Mobile app classification, CPG Product placements, Book genre classification, and soon, the proposed methodology can be utilized, where the hierarchies are well known and the naming convention is standardized. In some scenarios, some of the hierarchy level values may overlap between levels; however, items belong to only one node. The text input usually has properties including but not limited to intuitive information about the item, Size, Volume, quantity etc., Consistency in description, and Non-empty nodes.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an example network implementation 100 of a system 102 for hierarchical product classification in accordance with an example embodiment. In an embodiment, the system 102

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2-5.

Figure 2:
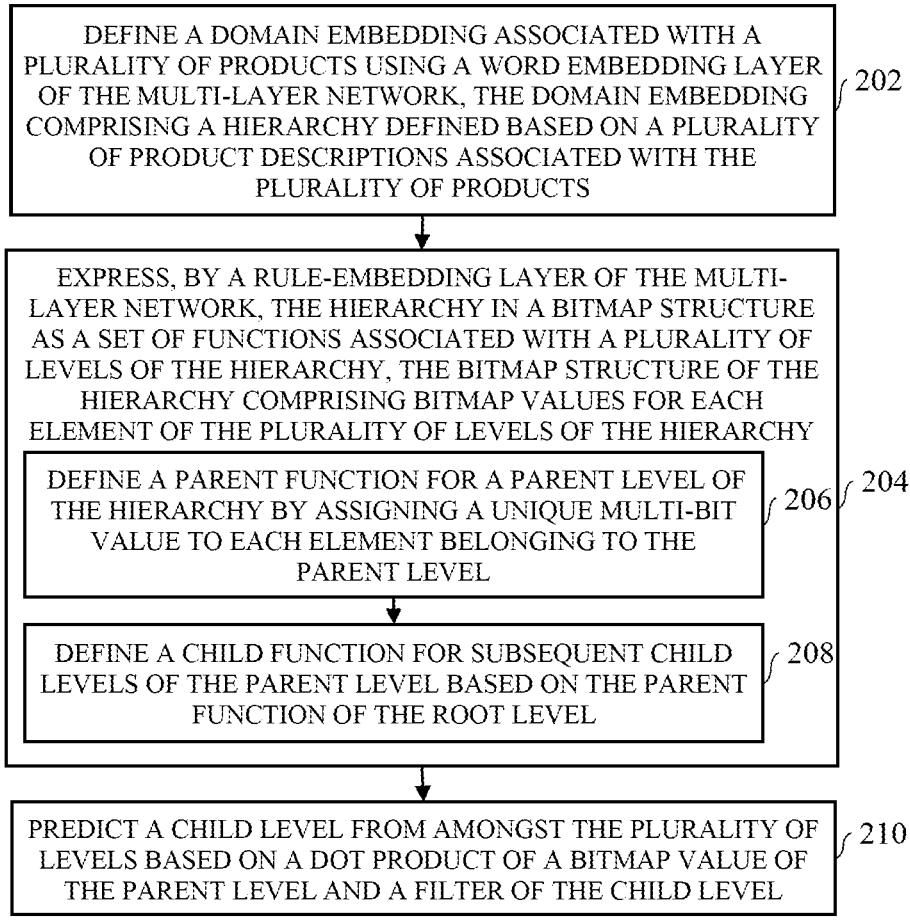
FIG. 2 illustrates a flow diagram for a method for hierarchical product classification in accordance with an example embodiment.
Figure 3:
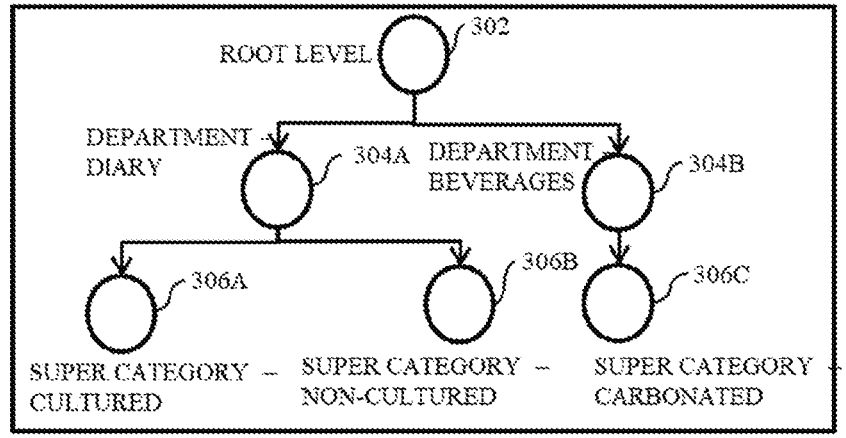
FIG. 3 illustrates an example portion of a hierarchy of products in accordance with some embodiments of the present disclosure.
Figure 4A:
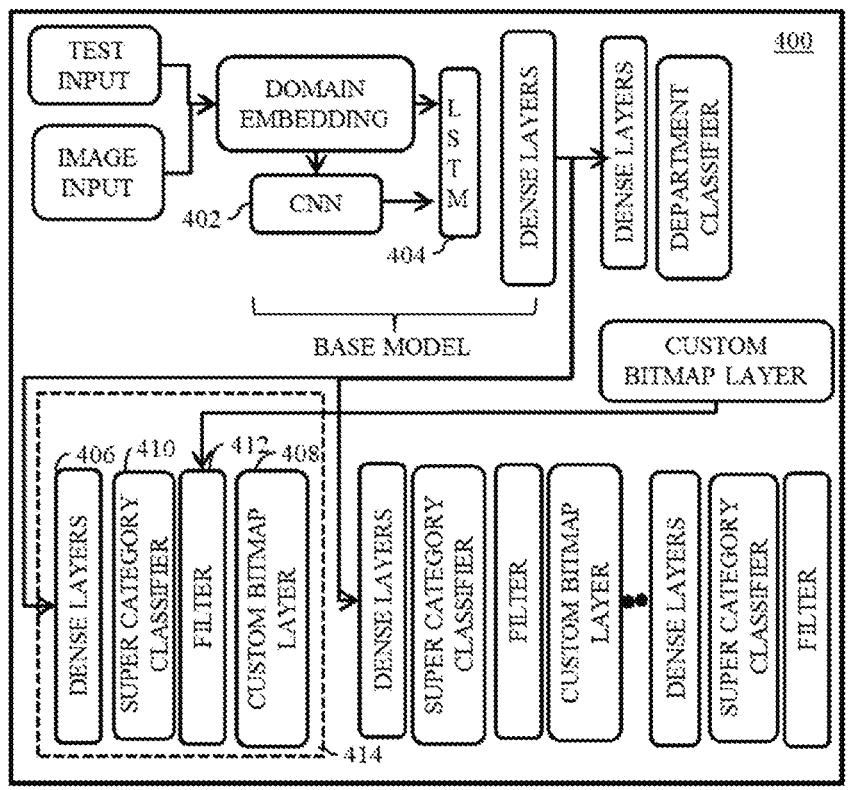
FIG. 4A illustrates a multi-layer network for hierarchical classification of products in accordance with some embodiments of the present disclosure.
Figure 4B:
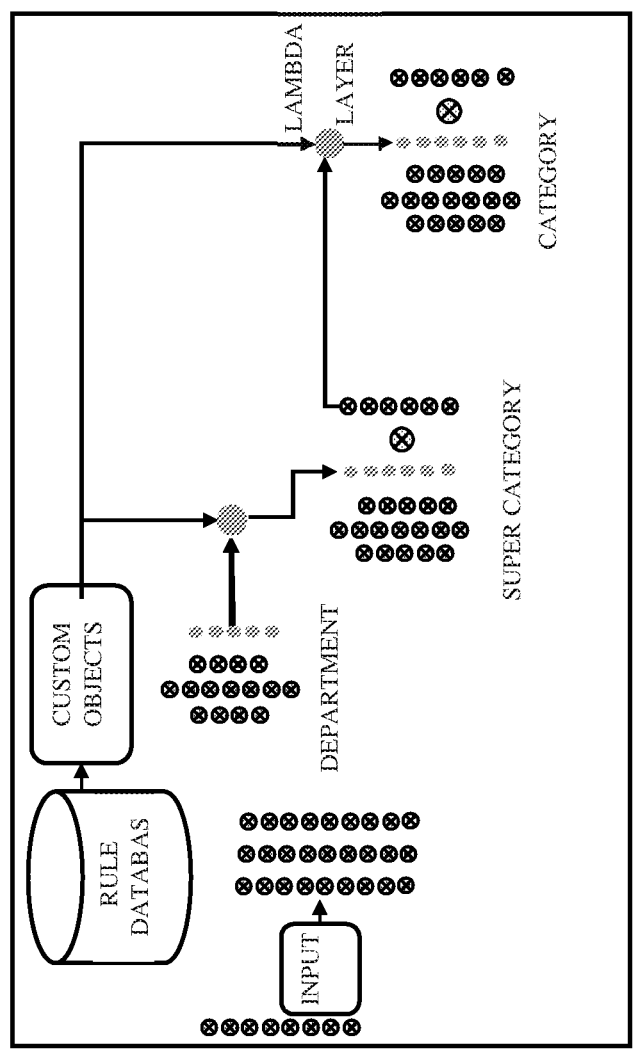
FIG. 4B illustrates a rule embedding layer of the multi-layer network of FIG. 4A in accordance with some embodiments of the present disclosure.

Referring collectively to FIGS. 2-4B, components and functionalities of the system 102 for hierarchical product classification are described in accordance with an example embodiment. For example, FIG. 2 illustrates a flow diagram for a method for hierarchical product classification in accordance with an example embodiment. FIG. 3 illustrates an example portion of a hierarchy of products in accordance with some embodiments of the present disclosure. FIG. 4A illustrates a multi-layer network for hierarchical classification of products in accordance with some embodiments of the present disclosure. FIG. 4B illustrates a rule embedding layer of the multi-layer network of FIG. 4A in accordance with some embodiments of the present disclosure.

In an embodiment, an input data is obtained for the purpose of hierarchical product classification. The input data may include, for instance, product description pertaining to the products. For example, the product descriptions obtained from the Web may include information such as title, brand, features description, and (optionally) reviews of the product. The disclosed method and system facilitates in classification of products into an existing product hierarchy (or taxonomy) based on the product description provided as input.

In an embodiment, the input data may be received from online and physical retailers POS systems. As is understood, the product description obtained from conventional POS systems may be limited in accuracy and correctness thereof. In addition, retailers may have their own naming convention and acronyms, thereby complicating the language models used for preprocessing the input data. Accordingly, reusing a common word embedding technique for the hierarchical product classification may be ineffective. In order to overcome the aforementioned challenges, the disclosed system utilizes an available large corpus to train a domain specific word embedding that is capable of understanding the relation between the acronyms, shortened words, UOM conventions and brands obtained from the input data.

The disclosed method and system utilizes a multi-layer network to define the domain embedding associated with a plurality of products arranged in a hierarchy. As previously described, the hierarchy may include a plurality of levels, with each level comprising a plurality of elements. An example hierarchy is illustrated in FIG. 3.

The example hierarchy of FIG. 3 is shown to include a root node 302 at level 1, followed by department node 304A, 304B at level 2, followed by super-category node 306A, 306B at level 3, followed by category node 306C at level 4 and so on. Herein, it can be observed that as the depth of levels increases (meaning thereby that the hierarchy moves from level 1 to level 2 to level 3 and so on), the number of elements in each level increases. For instance, in the depicted example hierarchy there is one element in level 1, two elements in level 2, 3 elements in level 3 and so on. In an embodiment, the disclosed multi-level network facilitates in hierarchical classification of products in the predefined hierarchy, for example hierarchy 200 of FIG. 2. An example of the multi-layer network is illustrated and described with reference to FIG. 4A.

Referring now to FIG. 4A, a multi-layer network 400 for hierarchical classification of products is illustrated. As illustrated, the multi-layer network 400 includes a word embedding layer and a rule-embedding layer. The word embedding layer is indicated by a base model including domain embedding, a CNN model 402 and a Long Short-Term Memory (LSTM) model 404 and a plurality of dense layers. The word embedding layer of the multi-layer network is configured to define domain embedding associated with a plurality of products. The domain embedding includes a hierarchy defined based on a plurality of product descriptions associated with the plurality of products. In an embodiment, the word embedding layer is utilized for defining a domain embedding associated with the products. The domain embedding includes a hierarchy defined based on a plurality of product descriptions associated with the said products.

The rule embedding layer (illustrated in FIG. 4A and FIG. 4B) includes a plurality of dense layers, a plurality of classifiers, a plurality of filters and a plurality of custom bit map layers. In particular, the word embedding layer includes a dense layer, a custom bit map layer, a classifier and a filter for each level of the hierarchy. For instance, the multi-layer network 400 is shown to include a dense layer (for example a dense layer 406), a custom bit map layer (for example a custom bit map layer 408), a classifier (for example a classifier 410) and a filter (for example a filter 412) corresponding for each of the plurality of levels, for example, the super category level 414 till the leaf level of the hierarchy (described in FIG. 4A). It will be understood that the components for remaining levels such as department level the category level and other leaf node levels have not been marked for the brevity of description. As illustrated in FIG. 4B, a lambda layer of the rule embedding layer converts the output of a previous layer and rule from custom objects to form a weight layer for the child level in the hierarchy. Herein, the Lambda layer is a custom forward propagation written to combine the tensor output of a parent layer (P) and the filter for the child layer. The filter is created by multiplying the output of parent layer (P) and the rule embedding matrix or the bitmap matrix which is an output of custom Rule embedding functions. The resulting filter may have increased probability multiplier for the predicted parent's children. Herein, the role of the custom rule embedding function is to intake a hierarchy and convert that into a bitmap matrix. Each row of the matrix represents a value in the parent level, whereas each column would represent the values in the child level. In each row, which represents a parent, the children who belong to that parent may be set as 1 and others as 0.

In an embodiment, the rule embedding layer expresses the hierarchy in the bitmap structure as a set of functions associated with a plurality of levels of the hierarchy. The bitmap structure of the hierarchy includes bitmap values for each element of the plurality of levels of the hierarchy.

In an embodiment, the hierarchy is expressed in the bitmap structure by defining a parent function fora parent level of the hierarchy and then defining a child function for subsequent child levels of the parent level. The parent function for the parent level is defined by assigning a unique multi-bit value to each element belonging to the parent level. Subsequently, a child function is defined for subsequent child levels of the parent level based on the parent function of the root level. In an embodiment, the child function is defined as:

$$f(Bitmap(level))=Bitmap(level+1)$$

The bitmap values for each element in each of the plurality of levels is precomputed and stored as filter in matrix formats. This is explained by taking an example of a hierarchy of depth N with root level R and levels L, fora Retailer, as a set of product characteristics. As an example, the product description may be dairy product "XYZ Garlic and Chili Cheese spread" whose characteristics mentioned in table 1:

TABLE 1

| Char Name | Char Value |
| --- | --- |
| Brand | XYZ |
| Department | Dairy |
| Super Category | Cultured |
| Category | Cheese |
| Sub Category | Spread |
| Segment | Flavored |

In an example embodiment, for the training of the system to predict the product categorization in the hierarchy, certain non-hierarchical characteristics (for example, product Brand) may be included to the training data during training in order to obtain a better understanding of the product.

It will be understood that the hierarchy is predefined and exists. Said hierarchy expressed in a tabular form, may be provides as the in putto the rule-embedding layer of the model. The tabular form of the hierarchy of Table. 1 is shown in Table 2 below.

TABLE 2

| Department | Super Category | Category |
| --- | --- | --- |
| Dairy | Cultured | Cheese |
| Dairy | Cultured | Yogurt |
| Dairy | Non-Cultured | Milk |
| Beverages | Carbonated | Flavored |
| Beverages | Non-Carbonated | Water |

The tabular form of the hierarchy can be expressed in a bitmap structure. For example, the department can be expressed, which has two unique values with just two bits, by first sorting the department (Beverages, Dairy) and assign a positional bit to each value. The "Beverages" can be expressed as 10 and "Department" as 01.

In the similar manner, the elements of the Super category can be expressed as:

Carbonated—100,Cultured—010,Non-Carbonated—001

Also, for the Category, the elements thereof can be expressed as:

Cheese—10000, Flavored—01000, Milk—00100, Water—00010, Yogurt—00001

Using the aforementioned technique of expressing the elements of the hierarchy as describe the hierarchy structure as a set of functions. This function will take the parent level's value and based on it will produce the next level's bitmap.

$$f(Bitmap(level))=Bitmap(level+1)$$

For example, if in put f(dept=='Beverages'):

$$f(10)=101 \text{ (Carbonated (Cultured)Non-Carbonated)}$$

The above example implies that only 'Carbonated' and 'Non-Carbonated' are selected for the next level, i.e. level+1, knowing that the current level is "Beverages". Hence the function facilitates in deciding the paths in the hierarchy to activate in the next step of prediction, thereby eliminating thousands of other unnecessary paths and thus extensively reducing the computations needed.

As mentioned earlier, the bitmap values for each element at each level may be calculated prior to the training and may be stored as filters in matrix formats. For example, matrix for Super category from above example may be as follows:

$$\begin{bmatrix} 1 & 0 & 1 \\ 0 & 1 & 0 \end{bmatrix}$$

The function f(level) may be represented as a dot matrix multiplication of two levels, as shown below:

For example, f(10) may be computed as:

$$[1 \ 0] \cdot \begin{bmatrix} 1 & 0 & 1 \\ 0 & 1 & 0 \end{bmatrix} = \begin{bmatrix} 1 \\ 0 \\ 1 \end{bmatrix}$$

where, the matrices $$[1 \ 0] \text{ and } \begin{bmatrix} 1 & 0 & 1 \\ 0 & 1 & 0 \end{bmatrix}$$

are precompiled matrices.

Herein, it will be understood that in neural classifiers, the values of the classifiers may be the probability of each class's occurrence. Thus, the row matrix may not be a simple zero or one, instead the row matrix may include decimals, as shown below:

$$[0.8374 \ 0.2632] \cdot \begin{bmatrix} 1 & 0 & 1 \\ 0 & 1 & 0 \end{bmatrix} = \begin{bmatrix} 0.8374 \\ 0.2632 \\ 0.8374 \end{bmatrix}$$

Herein, it will be appreciated that the probability is to be retained instead of rounding off the values to a one or a zero, since the multi-layered network may be able to learn the relation between the multiple levels of the hierarchy even though they belong to different parent levels. These relations are useful in representing the product in a latent space, which is used to calculate similarity scores between products.

When the network predicts a child level (for example, Super Category), the filter may be multiplied (vector multiplication) with the probability of the child level. Herein, filter is a probability vector from the previous parent level. All the non-relevant child nodes are marked as zero. Hence, multiplying the filter with the output of the child level gives a better focused result. This improves the probability of classes, which are actually the children of previous level prediction. In this example, children of "Beverages" will be boosted, whereas, children of "Dairy" may be dampened.

For a subsequent iteration, the child level may become a parent level and a subsequent level may assume the role of a child level. The child level may again be predicted by carrying out steps 202-210 (of FIG. 2). Herein, the prediction of a parent level (or elements of the parent level) may be referred to as a parent level prediction, and the prediction of a child level (or elements of the child level) may be referred to as a child level prediction.

If P is the parent level prediction where P in {P1, P2} and children are PC where PC is {p1c1, p1c2, p2c1} and probability of PC is h(PC) then a prediction filter may be:

$$\begin{bmatrix} h(p1c1) \\ h(p1c2) \\ h(p2c1) \end{bmatrix} \times \begin{bmatrix} p1 \\ p1 \\ p2 \end{bmatrix}$$

Herein, it will be understood that the child level in one iteration may become a parent level in the subsequent iteration (or next level in hierarchy). When the child level predictions (i.e. predicted elements of the child level) are different from the prediction of the parent's level (i.e. predicted elements of parent level), then the overall confidence of the prediction decreases, due to the contradiction. Such a scenario leading to decrease of overall confidence may occur, due to reasons such as wrong examples in the training data that may occur due to reasons such as but not limited to, some manual error; ambiguous items which seems to belong to multiple nodes of the hierarchy; items placed in a node of the hierarchy due to some specific reason, small enough, so the model ignores it in generalization; erroneous prediction of parent level, and so on. Based on a comparison of the child level predictions with the parent level predictions, a confidence score of prediction is computed. In an embodiment, the confidence scores may be obtained as a softmax output from the neural network for each level. Herein, Softmax function also known by (SoftargMax, Norm. Exponential function) takes in a vector of N real numbers (−inf, inf) and converts it into a probability distribution consisting of N Components. Each component is a real number between (0,1) and the sum equates to 1.

The output of the softmax function can be used to represent a Multi categorical distribution—that is, a probability distribution over K different possible outcomes. Softmax function is commonly used as the activation function in the last layer of a neural network. In the disclosed embodiments, since there are more than one output (levels of hierarchy), the Softmax function may be used in the final prediction layers.

The final output is a probability distribution of the given classes, the same is taken as the confidence scores for said level.

For example:
Assuming that there are seven departments in total and the final layer before applying Softmax function is:

$Z=[2.90,3.40,9.8938,2.0029,4.9289,3.00929,1.0293]$

After taking the exponentials, the vector looks like:

$Exp(Z)=[1.81741454e+01,2.99641000e+01, 1.98071844e+04,7.41051546e+00,1.38227379e+02,2.02730010e+01,2.79910577e+00]$

The probability distribution would be:

$Conf=Softmax(Z)=[0.10675819893764549, 0.12516478496137748, 0.364222161603199, 0.07373310229386557,0.1814484437047451, 0.11078151051071283,0.03789179798845466]$ Sum(Conf)=1
Argmax(conf)=3, which implies the 3rd department is the most probable outcome.

Figure 5:
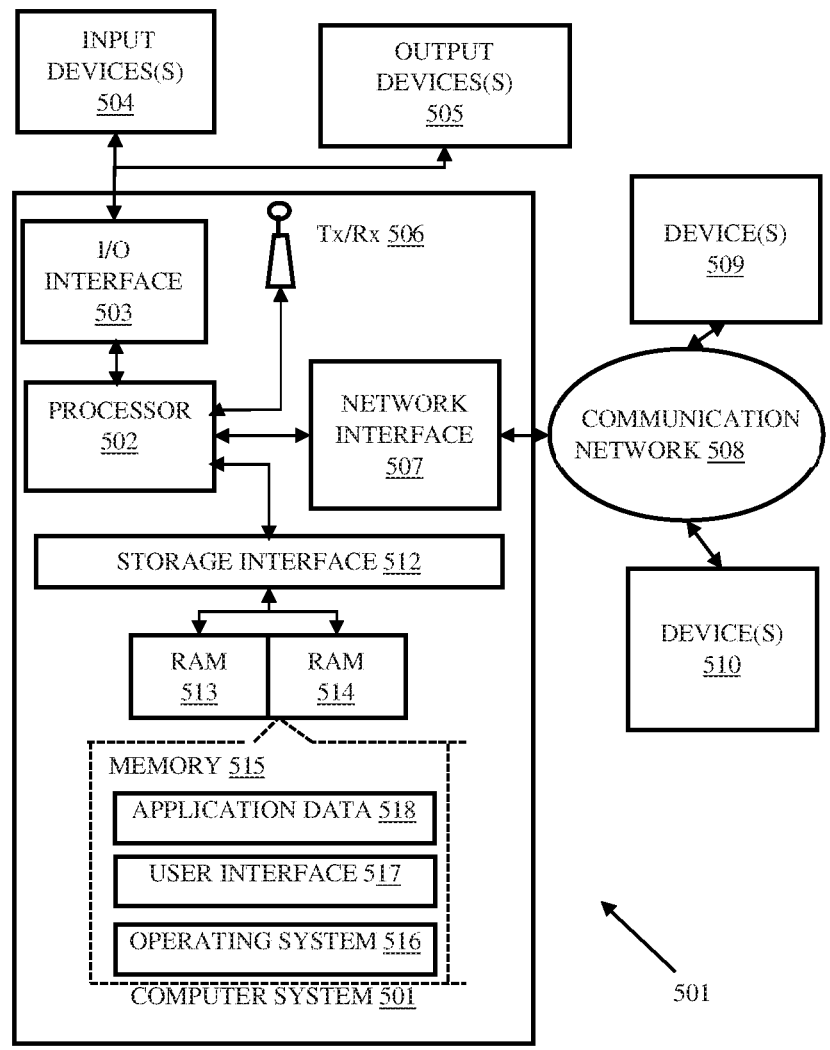
FIG. 5 illustrates a block diagram of an exemplary computer system for implementing embodiments consistent with the present disclosure.

FIG. 5 is a block diagram of an exemplary computer system 501 for implementing embodiments consistent with the present disclosure. The computer system 501 may be implemented in alone or in combination of components of the system 102 (FIG. 1). Variations of computer system 501 may be used for implementing the devices included in this disclosure. Computer system 501 may comprise a central processing unit ("CPU" or "hardware processor") 502. The hardware processor 502 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 502 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touch pad, trackball, sensor (e.g., accelerometer, light sensor, GPS, gyroscope, proximity sensor, or the like), stylus, scanner, storage device, transceiver, video device/source, visors, etc.

Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509 and 510. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 516, user interface application 517, user/application data 318 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Un ixX-Windows, web interface libraries (e.g., ActiveX, Java, Javascript, AJAX, HTML, Adobe Flash, etc.), or the like.

In some embodiments, computer system 501 may store user/application data 318, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provide method and system for hierarchical category classification of products in a robust and computationally efficient manner. In typical supervised hierarchical classification, the hierarchy structure is predefined. However, majority of the current machine learning methods either expect the model to learn the hierarchy from the data or requires separate models trained at each level taking the prediction of previous level as an additional input, thereby increasing latency in achieving training accuracy and/or requiring an explicit maintenance module to orchestrate inference and retrain multiple models (corresponding to the number of levels in the hierarchy). The disclosed method and system allows the predefined knowledge about hierarchy drive the learning process of a single model, which predicts all levels of the hierarchy. The disclosed multi-layer network model arrives at a consensus based on prediction at each level, thus increasing the accuracy and reducing the training time.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for product category classification by a multi-layered network model comprising:
    defining a domain embedding associated with a plurality of products using a word embedding layer of the multi-layer network, the domain embedding comprising a hierarchy defined based on a plurality of product descriptions associated with the plurality of products;
    expressing, by a rule-embedding layer of the multi-layer network, the hierarchy in a bitmap structure as a set of functions associated with a plurality of levels of the hierarchy, the bitmap structure of the hierarchy comprising bitmap values for each element of the plurality of levels of the hierarchy, wherein expressing the hierarchy in the bitmap structure comprises:
        defining a parent function fora parent level of the hierarchy by assigning a unique multi-bit value to each element belonging to the parent level, and
        defining a child function for subsequent child levels of the parent level based on the parent function of a root level of the hierarchy; and
    predicting, for the product category classification, a child level of the hierarchy from amongst the plurality of levels based on a dot product of a bitmap value of the parent level and a filter of the child level.

2. The method of claim 1, wherein the bitmap values for each element in each of the plurality of levels is precomputed and stored as the filter in matrix format.

3. The method of claim 2, wherein the child function is defined as:

$$f(Bitmap(level))=Bitmap(level+1).$$

4. The method of claim 1, wherein the rule embedding layer comprises a plurality of dense layers, each of the plurality of dense layers comprising filters for the plurality of hierarchy levels, wherein each filter comprises a custom bitmap layer, the custom bit map layer capable of estimating a probability of occurrence of a set of elements in each level of the plurality of levels of the hierarchy.

5. The method of claim 1, further comprising determining a confidence score associated with the prediction of the child level using a Softmax function.

6. The method of claim 1, further comprising connecting the parent level with the child level through a lambda layer, wherein output of the parent level is dependent on an accuracy of the child level.

7. A system (500) for product category classification by a multi-layered network model, comprising:
    one or more memories (515); and
    one or more hardware processors (502), the one or more memories (515) coupled to the one or more hardware processors (502), wherein the one or more hardware processors (502) are configured to execute programmed instructions stored in the one or more memories (515), to:
        define a domain embedding associated with a plurality of products using a word embedding layer of the multi-layer network, the domain embedding comprising a hierarchy defined based on a plurality of product descriptions associated with the plurality of products;
        express, by a rule-embedding layer of the multi-layer network, the hierarchy in a bitmap structure as a set of functions associated with a plurality of levels of the hierarchy, the bitmap structure of the hierarchy comprising bitmap values for each element of the plurality of levels of the hierarchy, wherein expressing the hierarchy in the bitmap structure comprises:
            define a parent function fora parent level of the hierarchy by assigning a unique multi-bit value to each element belonging to the parent level, and
            define a child function for subsequent child levels of the parent level based on the parent function of a root level of the hierarchy; and
        predict, for the product category classification, a child level of the hierarchy from amongst the plurality of levels based on a dot product of a bitmap value of the parent level and a filter of the child level.

8. The system of claim 7, wherein the bitmap values for each element in each of the plurality of levels is precomputed and stored as the filter in matrix formats.

9. The system of claim 8, wherein the child function is defined as:

$$f(Bitmap(level))=Bitmap(level+1).$$

10. The system of claim 7, wherein the rule embedding layer comprises a plurality of dense layers, each of the plurality of dense layers comprising filters for the plurality of hierarchy levels, wherein each filter comprises a custom bitmap layer, the custom bit map layer capable of estimating a probability of occurrence of a set of elements in each level of the plurality of levels of the hierarchy.

11. The system of claim 7, further comprising determining a confidence score associated with the prediction of the child level using a Softmax function.

12. The system of claim 7, further comprising connecting the parent level with the child level through a lambda layer, wherein output of parent level is dependent of an accuracy of child level.

13. One or more non-transitory machine readable information storage mediums comprising one or more instructions which when executed by one or more hardware processors cause:

defining a domain embedding associated with a plurality of products using a word embedding layer of a multi-layer network, the domain embedding comprising a hierarchy defined based on a plurality of product descriptions associated with the plurality of products;

expressing, by a rule-embedding layer of the multi-layer network, the hierarchy in a bitmap structure as a set of functions associated with a plurality of levels of the hierarchy, the bitmap structure of the hierarchy comprising bitmap values for each element of the plurality of levels of the hierarchy, wherein expressing the hierarchy in the bitmap structure comprises:

defining a parent function fora parent level of the hierarchy by assigning a unique multi-bit value to each element belonging to the parent level, and defining a child function for subsequent child levels of the parent level based on the parent function of a root level of the hierarchy; and predicting, for the product category classification, a child level of the hierarchy from amongst the plurality of levels based on a dot product of a bitmap value of the parent level and a filter of the child level.

\* \* \* \* \*